United States Patent Office 3,440,092
Patented Apr. 22, 1969

3,440,092
ART OF PRODUCING METAL SALT IMPREG-NATED SILICA-COATED SUBSTRATES
William V. Best, Independence, Mo., Roland L. Hughes, Leawood, Kans., and Lewis M. Austin, Toledo, Ohio, assignors to Owens-Illinois Glass Company, a corporation of Ohio
No Drawing. Filed Nov. 20, 1964, Ser. No. 412,837
Int. Cl. B05b *7/20;* C09k *1/00*
U.S. Cl. 117—33.5                               4 Claims

ABSTRACT OF THE DISCLOSURE

There is disclosed a process for depositing a sintered layer of finely divided silica containing an oxide of a transition metal or a rare earth metal upon the surface of a substrate having a linear coefficient of thermal expansion approximately the same as that of the finely divided silica in the fused state.

---

This invention relates broadly to the art of producing silica-coated substrates wherein the silica is in sintered and/or fused state but which, in its ultimate form, is preferably in fused state. More particularly the invention is concerned with a method of depositing or forming an adhering film or coating of ultrapure silica (including both the hydrated and dehydrated forms thereof) upon a substrate having a linear coefficient of thermal expansion that is approximately the same (that is, within about 10 index points when the said coefficient is written as $n \times 10^{-7}$) as that of the applied silica film in fused state. The substrate also should have thermal stability or endurance up to at least about 1600° C. Examples of such substrates are fused silica (quartz glass) and borosilicate glasses such as those which are commercially available as Vycor® glasses.

Deposition of an adhering, ultrapure silica film upon the aforesaid substrate is attained by applying to the substrate unmodified, nascent, finely divided silica, or such silica which has been modified with an effect agent, e.g., a rare earth-metal component. In the preferred embodiment of the invention the nascent, finely divided silica is directly deposited upon the substrate from a flame in which said silica is formed. A sintered (including partially sintered) film, which is usually permeable, is initially obtained. If the silica film as initially deposited does not have the desired degree of sintering, it may be heated to sinter it further (thereby increasing its density) at a sintering temperature of from about 1090° C. (2000° F.) to about 1315° C. (2400° F.).

With or without impregnation with an effect agent the sintered film can then be fused, if desired, in situ with any suitable source of high-temperature heat, such as a plasma or an oxyhydrogen torch, to form on the substrate a transparent, homogeneous film or coating of modified or unmodified, fused silica. When the effect agent is a compound such as, for example, a water-soluble salt of a rare-earth metal, coated substrates that are useful as neutron absorbers are produced. At least some of such coated substrates also are characterized by their luminescence (e.g., ultraviolet-fluorescence, phosphorescence, cathodo-luminescence, etc.), and may be used wherever luminescent structures or components are employed.

The applied coating may be of any desired thickness, e.g., from 0.1 to 100 mils or more, and the substrate may be in any desired form or shape, e.g., flatware, curved articles such as convex and concave substrates, bars, rods, tubes, cylinders, filaments (both mono- and multifilaments), reactors, laser excitations, and in other forms used in electronic, optical and other applications in the space, missile, communications and other industries.

Prior to the present invention the production of unmodified, ultrapure silica articles or structures, or such articles modified or "doped" with, for example, a rare earth-metal component, has been limited (because of the limitations of the available technique) to the production of solid cylinders, drawn fibers and the like. The prior-art procedure involved vacuum-fusion of thoroughly outgassed, extremely fine, amorphous silica powder in unmodified form or modified with a dopant. Such as a procedure was time-consuming and costly and, as mentioned above, was limited in its applicability.

The above-described difficulties are obviated by the present invention, which provides a method of unlimited applicability in the deposition of an unmodified or modified, ultrapure, adhering silica film or coating upon a substrate of the kind described in the first paragraph of this specification. The invention makes it possible to deposit or form transparent, doped or undoped silica films on Vycor or fused silica surfaces or substrates, or on other substrates having approximately the same linear coefficient of thermal expansion as the applied silica coating in fused state, and which are thermally stable (more particularly without material or substantial deformation) up to at least about 1600° C. Furthermore, the doped or undoped silica films may be made of any desired thickness as has been mentioned hereinbefore, and the surface topology of the substrate is not critical in the application of the silica film. In addition, the fusion of the initially applied silica film to its preferred ultimate form can be effected at atmospheric pressure.

It is a primary object of the present invention to provide a method of depositing an adhering, ultrapure silica film upon a substrate having a linear coefficient of thermal expansion approximately the same as that of the applied silica film in fused state, and also having the aforementioned thermal stability characteristics.

Another object of the invention is to provide new and improved techniques whereby there can be applied to a substrate of the kind described in the preceding paragraph ultrapure silica films modified with an effect agent, e.g., a rare earth-metal component.

Other and further objects of the invention will be apparent to those skilled in the art from the description given herein and from the appended claims.

The foregoing and other objects of the invention are attained by practicing the present invention as briefly described hereinbefore and more fully hereafter.

In carrying the present invention to effect there is applied to the substrate hereinbefore described nascent, finely divided silica either in unmodified form or modified with an effect agent, e.g., a rare earth-metal component.

Such a silica is preferably produced as described in the copending application of William V. Best and Roland L. Hughes, Ser. No. 412,614, filed Nov. 20, 1964, filed concurrently herewith, assigned to the same assignee as the present invention, and which by this cross-reference is made a part of the disclosure of the instant application.

FIGURE 1 of the aforesaid copending application shows by way of illustration a burner which is preferably utilized in practicing the present invention. This burner consists essentially of two reactant feed tubes which are constructed of high-temperature resistant tubing, eg., fused silica tubing, detachably but rigidly mounted on a suitable support. These reactant feed tubes are arranged at an angle of from 85° to 95°, specifically about 90°, to each other, and so that in operation an unconfined (i.e., substantially unconfined except for enveloping gas or gases) reaction zone is formed forward of one of the said reactant tubes.

The aforementioned reactant fee dtubes having orifices through which pass the reactant gases are preferably positioned as shown in the aforesaid copending application when preparing an unmodified silica. Each of these tubings is constructed of, for instance, fused silica tubing of 4 mm. I.D. When using tubing of 4 mm. I.D.., the diameter of the orifice through which is passed a gaseous reactant mixture comprising silicon tetrachloride plus air and/or oxygen advantageously is 2 mm. in diameter while the diameter of the orifice of the other feed reacant which supplies the gaseous hydrogen is 1 mm. The latter tube is positioned so that its orifice is slightly forward the orifice of the other feed reactant tube and on a lower plane so that, during operation of the burner, a conical-diffusion type of flame is produced. In other words, the reactant feed tube positioned in a vertical plane is slightly forward and slightly below the reactant feed tube positioned in a horizontal plane.

As shown in FIGURE 3 of the aforementioned copending application Ser. No. 412,614, filed Nov. 20, 1964, a suitable arrangement of the aforementioned feed reactant tubes with respect to each other is provided by having the orifice of the hydrogen-supplying tube from about 1 to 3 mm. forward the orifice of the tube supplying the $SiCl_4$ and air and/or oxygen and from about 1 to 4 mm. beneath a line which is an extension of the horizontal axis of the first-mentioned tube. The dimensions just mentioned are measured as indicated in FIGURE 3 of the aforesaid copending application Ser. No. 412,614, filed Nov. 20, 1964.

When the burner is employed, as in the instant invention, in the production of oxides that involve the use of a reactant such as hydrogen, a suitable flashback preventor, e.g., a silica-fiber gauze or any other flame-resistant gauze, advantageously is inserted in the tube through which such a reactant passes to the burner. Thus, the hydrogen-supplying tube optionally may be provided with a flashback preventor at any suitable point behind the orifice of the said tube in order to obviate the possibility of a flashback.

The gaseous reactants comprising A, $SiCl_4$ plus air and/or oxygen, and B, a hydrogen-supplying gas, are conducted from suitable supply sources to the burner through suitable conduits leading to the fused silica feed reactant tubes and which are, respectively, connected to each other by suitable fittings. The aforesaid conduits advantageously are made of a polyolefin, specifically polyethylene, while the fittings advantageously are made of a poly(perhalogenated)hydrocarbon, e.g., polytetrafluoroethylene, which is commercially available as Teflon® polytetrafluoroethylene.

In the burner described more fully and illustrated in the aforementioned copending application and which is suitable for use in practicing this invention, the high-temperature reaction zone is isolated from the aforesaid reactant feed tubes and from the burner container walls whereby contamination is minimized. The flame, which is of the conical-diffusion type, is created by careful impingement of two impinging ga streams at a predetermined angle with respect to each other that is within the range of 85°–95°, more particularly from about 88° to about 92°, and specifically about 90°, with respect to each other.

In operating the burner to produce the desired reaction product (viz, nascent silica), air and/or oxygen (dewpoint of, for example, $-72°$ F.) saturated with electronic-grade $SiCl_4$ (gas feed or stream A) is passed through, for example, a 2 mm. orifice in a first fused silica tube under a pressure of a few p.s.i.g., more particularly about 5 p.s.i.g. Pure hydrogen (gas feed or stream B) enters the burning zone at approximately a 90° angle with respect to gas feed A. For instance, it may enter the burning zone in a vertical direction through, for example, a 1 mm. orifice in a second fused silica tube. As mentioned hereinbefore, a silica-fiber gauze back of the orifice in the hydrogen-supplying feed tube prevents any possibility of a flashback. The result is a "blowpipe"-type flame in which a burning hydrogen cone completely surrounds the $SiCl_4$ plus air and/or oxygen stream immediately after the two streams come together. Hydrolysis and subsequent dehydration of the $SiCl_4$ plus air and/or oxygen stream occurs at the interface and within the hydrogen cone, for instance in a reaction zone within the said cone.

The aforementioned flame may be enveloped by a mass of secondary gas from any suitable source or, specifically, a secondary air stream from the surrounding atmosphere. The secondary air stream (or stream of air and/or oxygen) may be omitted, if desired, and a stream of an inert gas (e.g., nitrogen, helium, carbon dioxide, argon, etc.) substituted therefor. Alternatively, one may increase the proportion of oxygen in the admixture of $O_2$ and $SiCl_4$ although with decreased efficiency, i.e., decreased yield of $SiO_2$.

During operation of the burner the fused silica tubes remain cool even on the burner tips, and the flame zone is virtually isolated from any wall or burner contact. It is believed that this isolation does much to maintain impurities of other metallic oxides at a very low level.

In carrying out the process the flow conditions are preferably kept as close as possible to a ratio of 1 mole of silicon tetrachloride to 2 moles of hydrogen to 1 mole of oxygen in the form either of oxygen alone, or air alone or air plus oxygen. Air from the aforementioned secondary air stream assures complete combustion of hydrogen to produce water for subsequent hydrolysis of all $SiCl_4$. When air alone is used, the optimum molar ratio is 1:2:5 moles of $SiCl_4:H_2$:air, respectively.

The burner can be operated at any stoichiometry in which sufficient hydrogen and oxygen are present to produce a molar ratio of water to $SiCl_4$ in excess of 2:1. For economic reasons the upper limits of the feed reactants are about 1:10:25 moles of $SiCl_4:H_2$:air, respectively; or, when oxygen alone is used, about 1:10:5 moles of $SiCl_4:H_2:O_2$, respectively. Also, for economic reasons, the lower limits of molar ratios of feed reactants are those set forth in the preceding paragraph.

If desired, the burner can be operated using an overall ratio of 2:5:5 moles of $SiCl_4:H_2$:air, respectively. However, this is not economical since one-half of the silicon tetrachloride is lost with the by-product gases.

In preparing the $SiCl_4$-containing feed reactant, silicon tetrachloride vapor is mixed with dry oxygen and/or air (dewpoint of, for example, $-72°$ F.) prior to introduction to the burner in the following manner:

Dry oxygen and/or air is bubbled through a 500 ml. boro-silicate saturater containing electronic-grade $SiCl_4$. An electrical heater is employed to supply heat to the saturater in order to maintain its contents at a suitable temperature, e.g., from about 10° C. to about 50° C. Feed lines to and from the saturater are constructed of polyethylene tubing. Teflon connections are used to connect the feed lines to the saturater. A Teflon seal is used to provide a gas-tight seal on the body of the saturater.

The particle size of the silica produced in the flame as hereinbefore described appears to be a function of the burner stoichiometry and flame temperature. Finely divided silica has been collected which is in the $20\mu$ to $300\mu$ range. The by-products of the reaction involved in the production of the silica from silicon tetrachloride are HCl and water.

Any suitable means can be used in applying the unmodified or modified nascent silica to a substrate having a linear coefficient of thermal expansion that is approximately the same as that of the applied silica film in fused state, and also having the aforementioned thermal stability characteristics. For example, the substrate to be coated can be supported a short distance in front of the impingement point of the two reactant feed streams leading to the burner, the hydrogen-supplying tube being in a horizontal position and the tube supplying a mixture of $SiCl_4$ being at right angles thereto. The support for the substrate may be, for instance, a hollow structure of any desired form, shape or pattern such as round, square, rectangular, diamond-shaped, cloverleaf, etc., as desired or as conditions may require. This hollow support may be formed of, for example, borosilicate glass or fused silica. It may be positioned vertically about 10 to 20 mm. above the flame from the burner and so that the nascent, amorphous silica and by-product gases from the burner flame are directed into the support tube and against the substrate to be coated. The flame tip (visible combustion zone) may be, for instance, from about 1/4" to about 3/4" from the surface of the substrate.

Another means of applying the nascent silica to the substrate to be coated is to move the substrate in front of a fixed flame in which the nascent silica is generated so that all surfaces of the substrate are coated with the nascent silica.

Still another means of applying the nascent silica to the substrate to be coated, and one that is probably the most advantageous in coating large substrates, is to hold or permit the substrate to remain in a fixed position while moving the burner so that there is sprayed upon the substrate, over all or part of its surface (as desired or as may be required), a deposit of nascent silica. In other words, the burner is mounted for portable manual handling (as in a spray-type gun, for instance) and a coating of nascent, amorphous silica is sprayed upon the substrate by directing the spray back and forth (as in spray painting) until all desired surfaces of the substrate to be coated have been covered with a film of tenaciously adhereing silica.

Obviously still another means involves a combination of a moving substrate and a moving burner upon which substrate there is sprayed from the burner, over all or part of the surface of the substrate, a deposit of nascent silica.

As shown by one of the examples which follow, still another means is to rotate a substrate to be coated in the flame zone of the burner wherein the nascent silica is generated.

Other means of applying the nascent silica to the substrate will be apparent to those skilled in the art from the foregoing illustrative examples.

In all of the foregoing means, the generated nascent silica may be an unmodified nascent silica or it may be one which has been modified with an added effect agent, e.g., a rare earth or other metal component, as hereafter more fully described.

A substantial amount of the nascent silica that is deposited upon the substrate adheres thereto, and at least some of the individual particles are stuck together in sintered or other form, and adhere to the substrate.

After deposition of the coating of adhering, nascent silica upon the substrate, the coated substrate is usually further heated to increase the sintering together of the particles of applied silica. A suitable sintering range is from about 1090° C. to about 1315° C.

The sintered coating then may be fused with or without previous impregnation with a selected modifying or effect agent such as, for example, a water-soluble salt of a rare-earth element or of a transition element (e.g., copper, vanadium, manganese, etc.). Fusion of the sintered coating is effected by heating, e.g., with a plasma or an oxyhydrogen torch, at the required fusion temperature which may range, for instance, from about 1600° C. to about 2000° C. Higher or lower temperatures may be used as desired or as conditions may require. Fusion of the sintered coating yields a homogeneous, transparent film of modified or unmodified fused silica on the substrate.

Any suitable means may be used to impregnate the permeable, sintered film or coating of silica on the substrate with an effect agent such as an aqueous solution of, for instance, a water-soluble salt of copper, vanadium, manganese or other transition element or metal, or of a rare-earth metal. For example, such an aqueous solution may be applied by spraying, brushing, immersion of the permeable film portion of the substrate in a bath of the salt solution, or by any other means. The impregnated silica film is then dried, e.g., at temperatures ranging from ambient temperature to 120° C. or higher. The dried, impregnated film is then usually fused to form a transparent film as heretofore has been described.

Any water-soluble, rare-earth salt may be employed, as well as any water-soluble salt of copper, vanadium, manganese or other transition metal, but we prefer to use the nitrates or chlorides. Illustrative examples of salts of the rare-earth metals that may be used are the following water-soluble salts of—

Lanthanum:
  Acetate
  Bromate
  Bromide
  Chloride
  Molybdate
  Nitrate
  Sulfate Cerium:
  Acetate (ous)
  Bromate (ous)
  Carbonate (ous)
  Chloride (ous)
  Nitrate (ous)
  Selenate (ous)
  Sulfate (ous)

Praseodymium:
  Acetate
  Bromate
  Chloride
  Selenate
  Sulfate

Neodymium:
  Acetate
  Bromate
  Bromide
  Chloride
  Nitrate
  Sulfate

Samarium:
  Acetate
  Bromate
  Chloride
  Sulfate

Europium:
  Sulfate
  Chloride
  Nitrate

Gadolinium:
  Acetate
  Bromide
  Chloride
  Nitrate
  Selenate
  Sulfate

Terbium:
  Chloride
  Nitrate
  Sulfate

Dysprosium:
  Acetate
  Bromate
  Chloride
  Chromate
  Nitrate
  Selenate
  Sulfate Erbium:
  Chloride
  Nitrate
  Sulfate Thulium:
  Chloride Ytterbium:
  Acetate
  Chloride
  Sulfate Lutetium:
  Sulfate Water-soluble salts of yttrium, e.g., yttrium chloride nitrate or sulfate, also may be used. Although yttrium is not classified among the rare-earth elements in Mendeleev's Table of the Periodic Arrangement of the Elements, it functions in the same way as do those rare-earth metals listed in said table (water-soluble salts of which have been given above by way of example). Hence those skilled in the art presently consider yttrium among the rare-earth elements, and this is the classification given it in this specification.

Instead of producing a modified silica film by impregnating a permeable, sintered, silica film with a rare-earth salt or other modifier as above described, such a modified film can be obtained directly by introducing modifying or effect ingredients into the flame of the burner during the production of ultrafine, ultrapure silica. In this modification there is first produced a finely divided silica "smoke" intimately mixed with a uniformly dispersed fog or mist of an aqueous dopant comprising a water-soluble salt of a transition element such as, for example, copper, vanadium or manganese, or of a rare-earth metal, or of other selected effect agent(s). The modified nascent silica film may then be treated to effect further sintering of the modified silica particles on the substrate, after which it is heated at a higher temperature to form a fused coating of the sintered film. The sintering and fusing temperatures employed are the same as those mentioned hereinbefore.

The reaction of $SiCl_4$ with water in an oxygen- (and/or air-) hydrogen flame at temperatures of the order of 1000° C. and above takes place, when the present invention (including this modification) is practiced, in a containerless (substantially containerless) flame. Hydrolysis of the $SiCl_4$-oxygen and/or air stream occurs at the interface and within the hydrogen cone that envelop the said stream.

A finely divided fog or mist produced by the nebulization of a water solution of an effect agent such as a water-soluble, rare earth or other metal salt, e.g., terbium and/or europium nitrate or chloride, is directed into the flame zone (more particularly into the outer core thereof) of the above-described flame and wherein the hydrolysis of $SiCl_4$ to produce $SiO_2$ and HCl is occurring. The dopant is preferably introduced just beyond the intersection of the two impinging gas streams; or, if desired, it may be introduced further down stream but with less effectiveness. The ultrapure silica is formed and doped within and immediately after leaving the high-temperature flame zone.

Apparatus that is useful in practicing this embodiment of the invention is shown schematically in FIGURE 4 of the drawing that is a part of the aforementioned copending application Ser. No. 412,614, filed Nov. 20, 1964. The burner is constructed and operated in the same manner previously described, and as described in the aforesaid copending application with particular reference to FIGURES 1, 2 and 3 of the application, with the following exceptions: instead of the feed tube supplying the $SiCl_4$ plus air and/or oxygen being in a horizontal plane and the hydrogen-supplying tube in a vertical plane, both feed reactant tubes are in a horizontal plane and the dopant-containing mist is introduced into the flame from the bottom of the flame and pointed in the general direction of the forward part of the flame. If desired, the aforesaid mist may be introduced into the flame from the top and pointed, preferably, as above described with reference to the introduction of the mist from the bottom of the flame.

An effect or modifying agent such as, for example, a rare earth-metal compound is introduced into the outer core of the flame zone to produce a modified flame. Such an effect agent is introduced into the flame from, for instance, a nebulizer through a suitable supply conduit, which latter is formed, for example, of fused-silica tubing of 12 mm. I.D. and having an opening of the same diameter at each end.

The nebulizer is comprised of a main body member or container having a bottom wall through an opening in which passes a conduit for use in carrying an oxygen-supplying gas, more particularly oxygen and/or air, to an atomizer within the aforesaid container. A dopant comprising a water solution (i.e., an aqueous solution) of a water-soluble rare-earth salt or the like is placed, in practicing this embodiment of the invention, in the said container in an amount such that the level thereof is below the nozzle of the aforesaid atomizer.

In operation, oxygen and/or air is fed to the atomizer and passes at high velocity through the nozzle thereof. This stream of high-velocity oxygen-containing gas passes in front of the exit opening of a suction tube, thereby sucking the dopant through the said exit opening of the suction tube. The force of the blast directs the dopant against a ball point attached to the end of an arm of the atomizer, whereby the liquid spray is further subdivided as it falls from the said ball point.

The above-described operation of the nebulizer produces a finely divided mist of (1) oxygen and/or air, (2) water and (3) dopant, which mist is carried upward through the nebulizer and thence through the aforesaid supply conduit leading to the flame. This conduit passes through an opening in the top wall of the nebulizer, and extends only a short distance within the said nebulizer. As indicated hereinbefore, the opposite end of the supply conduit is advantageously positioned beneath the high-temperature flame zone with its forward edge headed in the general direction of the forward part of the flame. This arrangement provides better assurance that the mist or fog will be carried along the foward path of travel of the flame.

The finely divided droplets of dopant solution entrained in oxygen and/or air are carried into the flame zone of the burner, while the larger droplets fall to the bottom of the container where they become admixed with the liquid drawn into the atomizer inlet. It might here be mentioned that nebulization is markedly superior to simple, direct atomization because by this technique a more fineliy divided, homogeneous droplet size is obtained.

Instead of using oxygen and/or air as above described in introducing the mist or droplets of solution into the flame, one may use an inert carrier gas such as, for example, nitrogen, helium, argon, carbon dioxide, etc., in introducing the said mist into the said flame as hereinbefore described with reference to the use of mist containing oxygen and/or air. In this case, however, the efficiency of the operation is less.

The container portion of the nebulizer (i.e., top, bottom and side walls) and all atomizer parts are advantageously formed of a polyolefin, e.g., polyethylene, polypropylene, copolymers of ethylene and propylene or other olefins, and the like. However, any material of construction may be employed in making the nebulizer that is resistant to attack by the dopant solution and that will introduce a minimum amount of impurities (particularly metallic impurities), if any, into the modified silica product.

The amount of water-soluble rare earth-metal salt or the lke which is dissolved in water, and the resulting solution then introduced into the nebulizer, depends, for example, upon the chosen salt, its solubility in water, the amount desired to be introduced into the flame, which latter in turn depends upon the amount of rare earth-metal component (e.g., oxide) desired in the modified silica product, the chosen operating conditions under which the silica is produced, the chosen conditions of operating the nebulizer, and other influencing factors. The amount of water-soluble, rare-earth salt, or of such salts as water-soluble salts of transition elements, e.g., copper, vanadium and maganese salts, in the aqueous solution comprising the dopant ranges, for example, from about 0.1 g./liter up to a saturated solution at 50° C. Ordinarily, however, such a salt is used in an amount corresponding to from about 0.1 g./liter to about 100 g./liter. Obviously, no more rare-earth or similar salt should be employed than is necessary to produce the desired degree of modification of the silica product with rare earth-metal or similar component.

The ranges set forth in the preceding paragraph with regard to the amount of water-soluble, rare-earth or other metal salt in the aqueous solution are applicable both to the last-described technique for producing a finely divided, modified, nascent silica that can be deposited as a film on a substrate having approximately the same linear coefficient of thermal expansion as that of the said silica film in fused state and the aforementioned thermal stability properties; and, also, to the first-described technique wherein a permeable, sintered film is first deposited on the substrate, which film is then impregnated with an aqueous dopant such as, for example, an aqueous solution of a water-soluble salt of a rare-earth metal, or of other water-soluble salts of metals, examples of which have been given hereinbefore.

In order that those skilled in the art may better understand how the present invention can be carried into effect, the following examples are given by way of illustration and not by way of limitation.

EXAMPLE 1

The substrate used in this example is a plate of a borosilicate glass, specifically a Vycor glass, having a linear coefficient of thermal expansion of $8 \times 10^{-7}$ (0°–300° C.). The procedure is as follows:

A Vycor plate is placed on the upper end of a borosilicate tube (36 mm. I.D. and 50 mm. in length). The tube is supported by a clamp on the outside. A burner of the kind described hereinbefore and in copending application Ser. No. 412,614, filed Nov. 20, 1964 is positioned immediately below the bottom end of the borosilicate support tube at a distance of about 15 mm. and in such a vertical direction that amorphous silica and by-product gases from the burner flame are directed into the borosilicate tube and against the Vycor plate. In this arrangement the hydrogen-supplying feed tube is in a horizontal position and the feed tube supplying a mixture of $SiCl_4$ and air is at right angles thereto. The flame tip (visible combustion zone) is about ½″ from the surface of the Vycor plate.

A mixture of $SiCl_4:H_2$:air is fed to the burner in a molar ratio of 1:2.5:7.5 at a rate of about 1 mole of $SiCl_4$ per hour. After an application time of about 2 minutes for the deposition of finely divided, nascent, amorphous silica upon the Vycor plate, it is removed from its position on the aforementioned borosilicate support tube and allowed to cool to room temperature. The estimated surface temperature of the Vycor plate during deposition of the nascent silica is about 300° C.

The silica-coated Vycor plate, after drying at a temperature of from about 20° C. to about 800° C. over a period of 83 minutes, is placed in an electric furnace wherein it is heated over a period of 1 hour from an initial furnace temperature of about 2000° F. (about 1090° C.) to a furnace temperature of about 2300° F. (about 1260° C.). A sintered, permeable coating of silica is formed on the Vycor plate. This sintered coating of adhering silica on the Vycor plate is then fused in situ under the heat of a plasma torch at an estimated temperature within the range of from about 1600° C. to about 2000° C. The sintered coating fuses very nicely to a transparent film where the flame has been applied, giving an even surface of fused silica adhering to the substrate.

Vycor substrates having a coating of fused silica deposited thereon in the manner described in this example are useful, for instance, in applications such as those mentioned hereinbefore prior to the examples.

EXAMPLE 2

Essentially the same procedure is followed as described under Example 1 with the exception that first one Vycor plate (A) and then a second Vycor plate (B) are individually supported as described in Example 1 a distance of ½″ in front of the impingement point of the unreacted $SiCl_4$ plus air stream and the hydrogen stream for a period of 2 minutes. After an application time of 2 minutes the respective Vycor plate is removed from the flame zone and allowed to cool to room temperature (20°–30° C.). In each case the deposited nascent silica films, which are applied in the higher temperature zone of the flame at estimated surface temperatures of from about 600° C. to about 800° C., are partially sintered and are of greater density than the deposited silica film of Example 1.

(Parenthetically it may here be noted that increasing the temperature of deposition results in increasingly adherent, denser, silica films.)

Silica-coated Vycor plates A and B are first dried by heating at from about 20° C. to 800° C. as described under Example 1, after which plate B is heated at from about 1090° C. to 1260° C., likewise as described under Example 1. The same procedure is followed with regard to plate A with the exception that it is placed in an electric furnace wherein it is heated over a period of 1 hour from an initial furnace temperature of about 1200° C. to 1260° C. Both heat treatments yield a sintered, permeable adhering coating of silica on the plates.

The coating of sintered silica on plate A is then fused in situ under the heat of a plasma torch as described under Example 1 to yield a transparent film adhering to the substrate. The coating fuses very evenly. If desired, an oxyhydrogen torch may be used to fuse the sintered silica.

The sintered coating on plate B is doped with a 1%, by weight, aqueous solution of terbium nitrate,

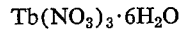

$$Tb(NO_3)_3 \cdot 6H_2O$$

The solution of the rare-earth salt is placed in a burette and 40 drops are applied to the sintered coating on the outer surface of the plate.

The surface coating of sintered silica impregnated with the terbium salt solution is then heated with a plasma torch as described under Example 1 to fuse the impregnated sintered silica coating. The fused, rare earth-modified silica film gives the characteristic fluorescence of terbium when subjected to 2537 A. irradiation.

In a similar manner one can impregnate the permeable sintered coating with an aqueous solution of a water-soluble salt, e.g., a chloride or nitrate, of other metals, e.g., copper, vanadium, manganese or other transition metals; or with terbium chloride or other water-soluble salts of terbium; or with any of the other water-soluble salts of rare-earth metals, numerous examples of which have been given hereinbefore.

EXAMPLE 3

To a burner of the kind used in Examples 1 and 2 are charged hydrogen through one feed tube and a mixture of $SiCl_4$ and $O_2$ through a second feed tube. The $SiCl_4$, hydrogen and oxygen are fed in the molar ratio of 0.5:2.0:1.5, respectively, and at the rate of 0.5 mole $SiCl_4$ per hour. Fused silica rods, about 6 mm. in diameter, are individually rotated within the burner flame zone approximately ½″ in front of the impingement point of the two gaseous streams issuing from each of the aforementioned feed tubes for a period of 10 minutes, and then removed. The surface reaction temperature is estimated at about 1000°–1300° C. A white, highly sintered film is deposited on those portions of each of the rods that were within the flame zone. This film is very adherent to the fused silica rod, and is much denser than is silica deposited at lower temperatures (600°–800° C.). The sintered film on each of the rods is fused with a high temperature torch (>1700° C.) to produce a transparent, fused silica coating on the substrate. The process may be repeated any number of times to increase the diameter of the silica rod to any desired size.

The following examples illustrate the direct deposition of modified, finely divided silica upon a substrate having a linear coefficient of thermal expansion approximately the same as that of the aforesaid modified silica in fused state. Specifically, the silica is modified with a rare earth-metal component to yield an adhering film of doped silica upon the substrate. The burner is the same as that used in Examples 1 through 3. The burner arrangement and the nebulizer, as well as their operation, are the same as described hereinbefore and in copending application Ser.

No. 412,614, filed Nov. 20, 1964 with reference to the production of modified silicas and as illustrated in FIGURE 4 of the said copending application.

Data on the operating conditions are given in the following table.

TABLE

| | Example No. | | |
|---|---|---|---|
| | 4 | 5 | 6 |
| | Using Tb(NO$_3$)$_3$·6H$_2$O | Using TbCl$_3$ | Using Tb(NO$_3$)$_3$ and Eu(NO$_3$)$_3$ |
| Operating time (min.) | 60 | 65 | 60 |
| Hydrogen (moles) | 10.26 | 2.51 | 7.25 |
| Saturater air (moles) | 10.56 | 10.59 | 6.30 |
| Nebulizer (oxygen) (moles) | | | 13 |
| Silicon tetrachloride (moles) | 3.52 | 3.53 | 3.35 |
| Dopant conc. (grams/ml.) | 0.03 | 0.05 | [1] 0.004 |
| Total ml | 19 | 11 | 15 |
| Grams/ml | | | [2] 0.004 |
| Total ml | | | 15 |
| Doped silicon dioxide (moles) | 1.10 | 0.77 | 0.48 |
| Doping range atomic p.p.m. | [3] 370–1,200 | [3] 570–2,600 | [3] 52–370 and [4] 53–385 |
| Overall efficiency (percent) | 21 | 22 | 14 |

[1] Tb(NO$_3$)$_3$.  [2] Eu(NO$_3$)$_3$.  [3] Terbium.  [4] Europium.

In the foregoing table, the lower values of the doping ranges are calculated assuming 100% introduction of dopant to the burner and with the overall efficiency as given in the table. The upper values of the stated ranges are calculated on the assumption that there is 100% introduction of dopant to the burner with the entire collection of dopant occurring within the body of SiO$_2$ deposited on the substrate or otherwise collected; and on the further assumption that no dopant has been lost along with uncollected silica and by-product gases.

In each of the foregoing examples doped silica is deposited on plates of Vycor and of fused silica by moving the individual plates back and forth at or closely adjacent to the tip of the flame until an adhering layer of modified silica has covered the desired area of the surface of the substrate. The thusly coated plates are cooled, and then heat-treated as described in Example 1 to obtain initially more completely sintered coatings of the modified silicas, and finally homogeneous, transparent, fused films on the substrates upon heating at fusion temperatures. Fusion temperatures, e.g., about 1600° C.–2000° C., can be provided by using, for instance, an oxyhydrogen or a plasma torch.

Thermally stable substrates of fused silica or the equivalent thereof having a film or coating thereon of fused silica modified with a rare earth-metal component or a transition-metal component are useful, for instance, in devices involving electron bombardment of the coated substrate.

We claim:

1. A process for depositing a sintered layer of finely divided silica containing an oxide of a transition metal or a rare earth metal upon the surface of a substrate having a linear coefficient of thermal expansion approximately the same as that of the finely divided silica in the fused state which comprises impinging at an angle of about 85 to 95° a gaseous hydrogen stream with a gaseous stream of SiCl$_4$ and oxygen within a reaction zone at a high elevated temperature so as to produce a burning silica forming flame, directing the flame toward the substrate so as to deposit a sintered layer of finely divided nascent silica thereon, impregnating the deposited silica layer with a water solution of a water-soluble salt of a transition metal or a rare earth metal, and then fusing the impregnated sintered layer in situ upon the surface.

2. The process of claim 1 wherein the flame is contacted with the substrate.

3. The process of claim 1 wherein the water-soluble salt is a chloride or nitrate.

4. The process of claim 1 wherein the water-soluble salt is terbium nitrate.

References Cited

UNITED STATES PATENTS

| | | | |
|---|---|---|---|
| 1,869,163 | 7/1932 | Niedergesass | 117—125 X |
| 2,188,121 | 1/1940 | Smith. | |
| 2,636,832 | 4/1953 | Blodgett. | |
| 2,967,113 | 1/1961 | Liebhafsky et al. | |
| 3,109,747 | 11/1963 | Foote. | |
| 3,275,408 | 9/1966 | Winterburn | 117—105.2 X |

ALFRED L. LEAVITT, *Primary Examiner.*

J. H. NEWSOME, *Assistant Examiner.*

U.S. Cl. X.R.

117—46, 105.2, 106, 124, 125